June 26, 1956 A. FACCHINI 2,751,948
CHERRY PITTER HAVING THREE SPOON SHAPED PITTING BLADES
Filed July 30, 1952 3 Sheets-Sheet 1
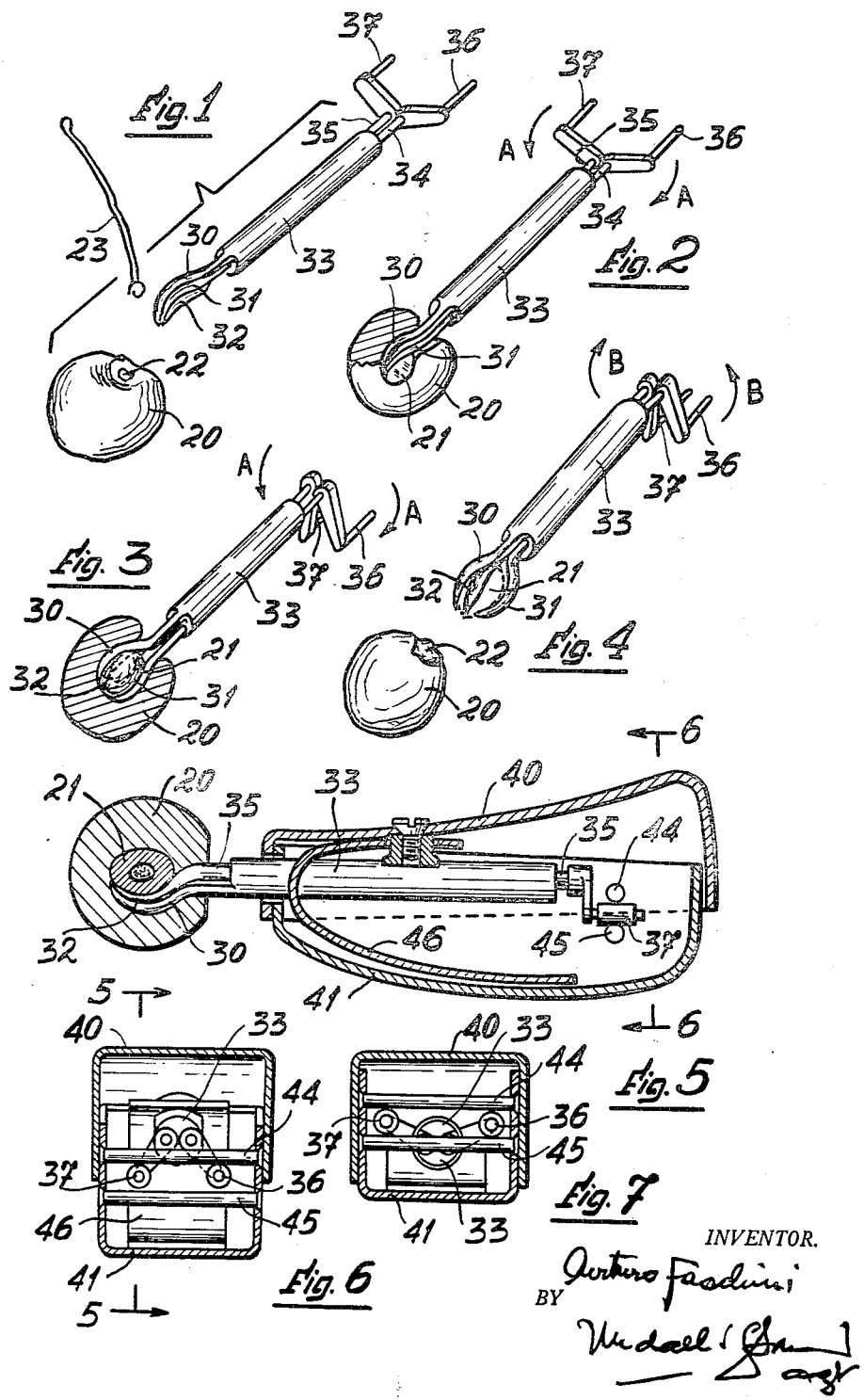
INVENTOR.

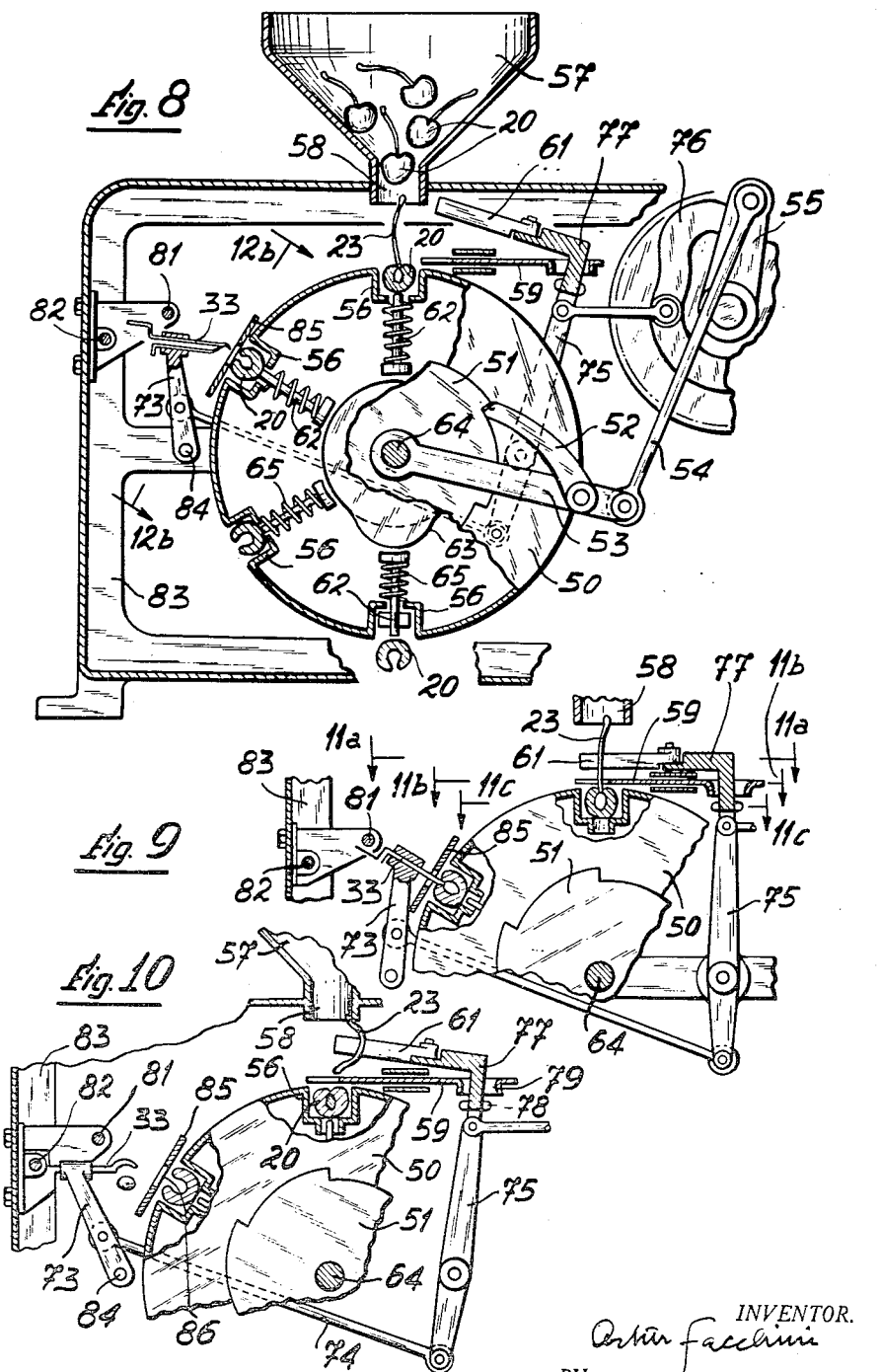

June 26, 1956  A. FACCHINI  2,751,948
CHERRY PITTER HAVING THREE SPOON SHAPED PITTING BLADES
Filed July 30, 1952  3 Sheets-Sheet 3
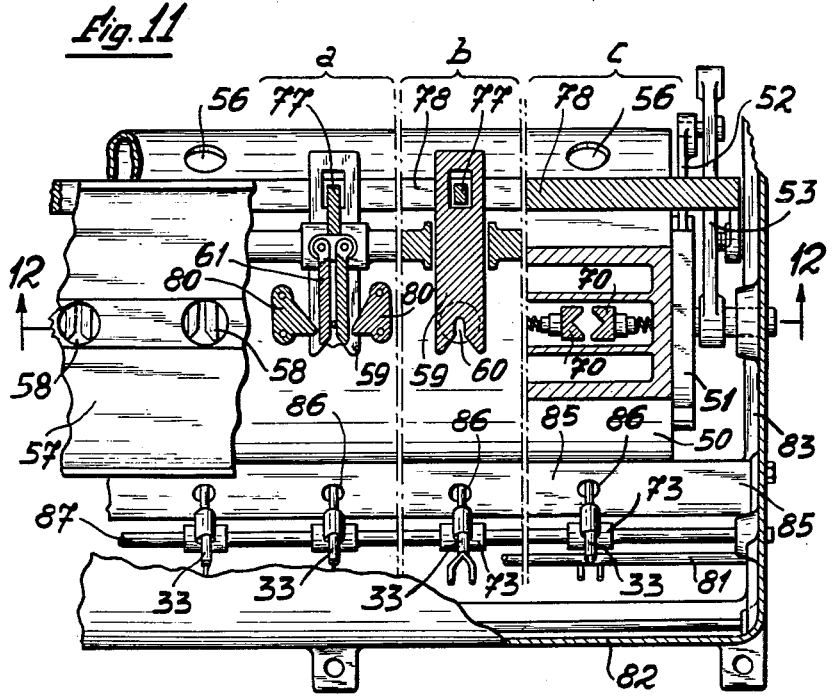
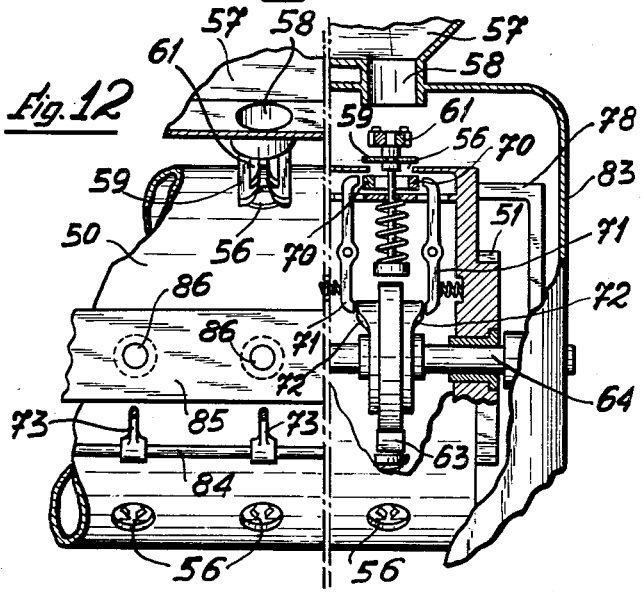
INVENTOR.
Arturo Facchini
BY United States Patent Office 2,751,948
Patented June 26, 1956

2,751,948

CHERRY PITTER HAVING THREE SPOON SHAPED PITTING BLADES

Arturo Facchini, Voghera, Pavia, Italy, assignor to Teresa Cavanna, Voghera, Pavia, Italy Application July 30, 1952, Serial No. 301,764

Claims priority, application Italy August 3, 1951

1 Claim. (Cl. 146—18)

This invention relates to a method for drawing out, or extracting, the pit or "stone of fruit" from cherries and/or other fruit of like character, e. g. hard black cherries or apricots, or plums, peaches and other fruits of the type having an outer relatively soft, pulp and edible body and an inner pit, or stone, of hard and inedible woody material fully enclosed in said outer body.

This invention includes, in addition, novel types of apparatus for carrying out said method either in the case of limited or of mass production of stoneless fruit of the character referred to above.

Specifically, the new method and apparatus according to this invention are designed for the production of stoneless fruits like those mentioned above, particularly intended to be successively treated in the form of candied fruits and the like, i. e. into a commercial form in which the fruits are required to be stoneless, but however, a substantially neat and safe external appearance of the same is desired most.

In more detail, an object of this invention is to provide a new and useful method which comprises the steps of introducing into and through the said outer pulpy edible body a pointed and cutting device, substantially in the form of a curved narrow spoon having a pointed tip and sharpened side edges, formed by the combination of a plurality, and preferably of three, members of lanceolated curved shape fitted to follow the rounded surface of the stones of fruit, all said members with the exception of one being rotatable about said rounded surface, of moving said movable curved members inside said fruit and about the stone thereof in such a manner as to have the pulp of fruit cut about said stone and to have the latter seized between said curved members, and then of pulling said device out of the fruit for having the seized stone thereof drawn out through the same opening made by the introduction of said device into the fruit.

In a preferred mode of carrying out the method outlined above, the stem of the fruit is removed by a pulling action from the fruit prior to introduction of said device into the fruit, and the said introduction is then performed through the same opening caused by the said removal of the stem. A fruit of the character described and made stoneless by applying the above method does not show any substantially apparent damage on the surface thereof, but few neat substantially closed and short cuts which do not affect either the pulp or juice of the fruit or the appearance of the same, the most desired commercial value thereof being therefore attained.

Another object of this invention is to provide a new, simple and cheap apparatus comprising one device of the character referred to above, in combination with means for handling same in view of its introduction, operation and extraction into and respectively out of the fruit for having the stone thereof extracted in accordance with the invention.

A further object of this invention is to provide another embodiment of an apparatus according to the invention, more particularly designed for mass production, said other apparatus comprising, in combination with one or, preferably, with a plurality of devices of the above type and mode of operation, means for successively feeding single fruit into position for treatment by said device or said devices, means for firmly holding said fruit as said device or devices operate thereinto and means for delivering the fruit made stoneless upon completion of the cycle of operation of said device or devices.

An additional object of this invention is to provide, in an apparatus constructed according to said another form of embodiment of the invention, means for successively feeding the fruit into said feeding means in such a position that the cutting and seizing members of the devices of the character referred to above penetrate into said fruit through or at least substantially through the tear or opening caused in the surface thereof by the prior tearing off of the stems from the respective fruits, therefore having the method according to the invention automatically performed according to the above preferred mode of carrying out said method.

A further additional object of this invention is the provision, in an apparatus of the above type, of an automatically operated stem removing means for tearing off the stems from the fruit prior to the action of said stone drawing out device, clasping means for taking hold of said fruit in said feeding device or means as the stems are torn off, and seizing means for firmly keeping said fruit in said feeding means in the correct position for having the said fruit perforated by the cutting and seizing members of said devices substantially at the point from which the stems have previously been torn off.

These and such other objects of this invention as may hereinafter appear may be best understood from a consideration of the following detailed description of embodiments thereof, such as are shown in the accompanying drawings, wherein Figures 1 to 4 inclusive are diagrammatic perspective views of a cutting and seizing device according to this invention, at the different steps of the method referred to above, Figures 5, 6 and 7 show a simple form of embodiment of an apparatus according to the invention, in the form of a hand operated tool for carrying out said method, and Figures 8 to 12 inclusive illustrate a self-acting apparatus according to this invention for mass-producing stoneless fruits of the character described, according to the preferred method of the invention and which has been successfully proved.

More particularly:

Fig. 1 illustrates the step of approaching a device of the above type to a cherry, the stem of which has been torn off;

Fig. 2 illustrates the step of introducing the operative portion of the device into the cherry and about the stone thereof;

Fig. 3 illustrates the step of having the pulp of the outer body of the fruit cut about the stone thereof and of having said stone seized between the curved lanceolated members of said devices, and Fig. 4 illustrates the step of drawing out the seized stone from said outer body of the fruit.

Fig. 5 is a longitudinal sectional view on line 5—5 of Fig. 6 of a hand operated simple apparatus constructed according to one form of embodiment of this invention;

Fig. 6 is a cross-sectional view of same, on line 6—6 of Fig. 5, and

Fig. 7 is a like cross-sectional view of same, in which the apparatus is illustrated in another condition of operation.

Fig. 8 is a vertical cross-sectional view of a self-acting apparatus for mass-production constructed according to another embodiment of the invention;

Figs. 9 and 10 are fragmentary similar cross-sectional views of the same apparatus, in different phases of the cycle of operation thereof, and illustrating the several operative positions of the various parts and devices comprised therein as performing successive steps of said method in its most preferred form.

Fig. 11 is partly a plan view and partly a horizontal sectional view of the same apparatus, said sectional views being taken on different planes as indicated by lines 11a—11a, 11b—11b and 11c—11c of Fig. 9 referring to sections "a," "b" and "c," respectively, of said Fig. 11, and Fig. 12 is partly a vertical sectional view of the same apparatus, on line 12—12 of Fig. 11, and partly an inclined side view of same, as it appears from the plane and direction indicated by the line and arrows 12b—12b of Figure 9.

Like reference characters indicate like parts throughout the several figures and, in general, numeral 20 indicates a fruit of the type referred to above (example given: a cherry), numeral 21 the stone thereof and numeral 23 the stem thereof. Further, reference numeral 33, which will indicate the body member of the cutting and stone seizing device where the latter may be shown in detail (Figs. 1 to 7 inclusive), will also indicate the whole device in general, where shown in reduced scale (Figs. 8 to 12 inclusive), for simplicity's sake.

Referring first to Figs. 1 to 4 inclusive; the basic method according to this invention may be carried on by using devices, a typical form of construction of which is shown in said figures in its structure and operation. Said device comprises preferably three members having fore portions 30, 31 and 32, respectivley, of curved lanceolated shape or, in other words, in form of very narrow and bent spoon, having a pointed tip and sharpened side edges, the curvature of said fore portions corresponding substantially to the curvature of the rounded flanks of the stone 21 of the fruit 20 from which said stone is to be drawn out. The said fore portions are relatively movable about an axis which substantially corresponds to the major axis of the stone 21, supposing that the latter has been placed adjacent to said portions on the inner face thereof, preferably, fore portion 30 is made integral with a small cylindrical rod 33, in the form of an extension thereof, and fore portions 31 and 32 are actuated by the fore end of small shafts 34 and 35, respectively, longitudinally and rotatably supported in said body 33, the said shafts 34 and 35 being provided with a crank-shaped rear portion 36 and 37, respectively, external to the rear end of said body 33.

A device constructed according to this invention, operates as follows while drawing out the stone 21 from a fruit 20 of the type referred to above: by properly acting on the crank rear portions 36 and 37 the fore portions 31 and 32 are brought towards the fore portion 30, and preferably in partial superimposed relationship therewith, in such a manner that said three fore portions 30, 31 and 32 constitute, in combination, a substantially narrow, curved, pointed and sharp-edged spoon, as shown in Fig. 1. Said combination of fore portions, which will hereinafter be indicated by the expression "operative part of the device," for simplicity's sake, as this specification proceeds, may be easily pushed inside the fruit 20 by perforating the surface and by cutting the inner pulp thereof, up till said curved operative part of the device will be positioned adjacent to the flank of the stone 21 inside said fruit 20, as shown in Fig. 2.

Preferably, the said operative part of the device will be introduced into the outer pulp body of fruit 20 through the opening or tear 22 previously made by properly tearing off the stem 23 of the fruit from the latter, the said tear 22 being made larger by small and substantially imperceptible radial cuts caused by the sharpened edges of said operative parts. As said operative part of the device has been brought into the fruit 20 in the position described in referring to Fig. 2, by properly rotating, in direction A, the crank rear portions of shafts 34 and 35 with respect to body 33 and to portion 30 made integral therewith, the laterally placed fore portions 31 and 32 are caused to correspondingly rotate about the stone 21 inside fruit 20, until an angularly spaced position of any fore portion 30 or 31 and 32 with respect to any other of said fore portions may be attained inside fruit 20, as shown in Fig. 3.

During the motion of said fore portions inside fruit 20 and about the stone 21 thereof, the sharp edges of said portions cut the pulp of the fruit 20 adjacent to the surface of said stone 21 separating the latter from the former, and as said fore portions attain their spaced relationship about said stone 21, as shown in Fig. 3, said stone will be seized between said fore portions, which constitute substantially a small cage about said stone. At this step, said stone may therefore be drawn out from the fruit 20 by properly pulling out the said operative part of the device therefrom, which part carries out said stone between the spaced and cage forming fore portions 30, 31 and 32 thereof, as shown in Fig. 4, wherein the stone 21 is indicated by dotted lines for permitting the fore portions 30, 31 and 32 to be viewed in their spaced and stone seizing relationship.

Finally, by rotating said rear crank portions 36 and 37 back in the direction indicated by arrow B, the said fore portions 30, 31 and 32 may be carried back from their spaced and stone seizing relationship of Fig. 4 to their closed relationship of Fig. 1, for having the stone 21 removed from said operative part of the device and for having the latter ready for a new cycle of operation.

At this point it will be easily understood by those skilled in the art that I have devised a new and useful method and, in addition, a novel device for carrying out said method, by which method and device a stone of a fruit may be easily withdrawn from the fruit, without substantial harm to the external appearance, the pulp or the substance of the fruit. More particularly, it will be apparent that by applying the above described method and device, a stone of a fruit may be drawn out from the fruit by perforating the surface thereof in one position and, by applying the further above described preferred mode of carrying out said method, by perforating said surface at a single point corresponding to a natural and regular tear in said surface, such a tear being caused by the removal of the stem. Further, owing to the fact that said perforation is made larger by neatly made radial cuts, expansion of said tear for extraction of the operative part of the device in spaced and stone seizing and carrying relationship of the portions thereof, temporarily occurs only during the passage of said parts only, the pulp of the fruit having in the most cases sufficient resiliency for perfectly closing said radial cuts upon passage of said parts, thus making the external appearance of the fruit made stoneless substantially unchanged from the fruit in its original form.

The above described method and device may be carried out and respectively operated by using a simple and cheap apparatus constructed according to this invention as shown in Figs. 5, 6 and 7. Referring now to said figures:

According to said embodiment, a device as above described and shown in Figs. 1 to 4 is constructed to co-operate with a handle forming assembly, composed of opposite relatively movable box-shaped members 40 and 41 which are related and arranged with respect to one another substantially as a rectangular open box and a rectangular cover, in a variable copenetrating relationship. The members supporting body 33 of the device are firmly connected to the inner surface of member 40 and a pair of spaced parallel cross-rods 44 and 45 are arranged between the side portions or flanks of member 41 and made integral therewith. The cross-rods 44 and 45 are so arranged inside said chamber that the rear crank portions 36 and 37 of the rotatable shafts 34 and 35 of the above described device are slidably engaged between said cross-rods to co-operate therewith. A suitable spring means (a leaf spring 46, for example), is provided for urging said members 40 and 41 apart, i. e. for expanding said handle forming assembly.

The above described parts and members are designed and assembled in a manner whereby, as said members 40 and 41 are in their spaced relationship, as shown in Figs. 5 and 6, the co-operation of cross-rods 44 and 45 with said rear crank portions 36 and 37 causes the operative parts of the device to close as shown in Figs. 1 and 2, while by pressing said members 40 and 41 one towards one another, i. e. by grasping the handle forming assembly, the said co-operation causes the fore portions 31 and 32 of said operative part to rotate in direction A (Figs. 2 and 3) with respect to fore portion 30 until the spaced and stone seizing relationship of said fore portions, shown in Figs. 3 and 4, is attained. By releasing the pressure on said handle forming assembly, the action of said spring 46 urges said members 40 and 41 from their closed position (shown in Fig. 7) to their spaced position as shown in Figs. 5 and 6, therefore causing the said fore portions 31 and 32 to rotate back in direction B until the said operative parts of the device again attain the convening position as shown in Figs. 1 and 2.

An apparatus as described above and shown in Figs. 5, 6 and 7 may be easily hand operated for carrying out the method according to this invention. By taking hold of said apparatus about the said handle forming assembly comprising members 40 and 41, a skilled operator may easily introduce the said operative part of the device into a fruit 20, preferably through the tear 22 of the surface thereof, brought about by prior tearing off of stem 23, as stated above. During said introduction and up till said operative part reaches the position shown in Fig. 2 inside the fruit 20, the operator does not press on members 40 and 41. Then, as said position of Fig. 2 is reached, pressure exerted about the said handle forming assembly causes the said operative part to perform the described steps of cutting the pulp of fruit about the stone thereof and of seizing said stone. At last, simple extraction of said operative part of the device from the fruit causes the desired extraction of the stone.

The use of the simple apparatus as described above by skilled operators will bring about substantial advantages with respect to any method and procedure heretofore known for drawing out stones from fruit of the character described, both with reference to the time required and the neatness of operation.

For the purpose of mass production, I have further devised a wholly automatic apparatus in which fruit may be fed in their natural form (i. e. having stones and stems) and from which fruits made stemless and stoneless according to the method described may be delivered. Said apparatus will be hereinafter described with reference to Figs. 8 to 12 inclusive in one embodiment thereof, such as shown in said figures, in which said apparatus is illustrated in part only, in consideration of the fact that it comprises a combination of operative assemblies in co-axial relationship and constructed and operating in like manner, the disclosure of one of said assemblies applying to any other of same.

Said apparatus comprises a cylinder or drum 50 which actuates the feeding means for feeding single stemless fruits under the action of a plurality of devices 33 of the type described with reference to Figs. 1 to 4. Said cylinder 50 is rotatably supported about a horizontal shaft 64 supported by and fixedly connected to a suitable frame structure 83. On the outer surface of said cylinder 50 a plurality of hollows or recesses 56 are provided; the said recesses are so dimensioned as to contain one single fruit 20 and they are arranged, in a plurality of rows aligned along spaced lines parallel to the cylinder axis and in uniformly spaced relationship on any of said lines. In the embodiment shown, the said cylinder 50 comprises six rows of recesses 56, angularly spaced at 60° with respect to one another about the surface thereof, but it will be understood that a smaller or a larger number of rows might be provided in a construction according to this invention provided that said rows are uniformly positioned about said cylinder surface at like angular spacings.

The said cylinder 50 is made integral with a toothed gear 51 having a plurality of uniformly spaced jig-saw shaped teeth, there being the same number of teeth as the number of rows of recesses 56, the said toothed gear 51 co-operating with a pawl 52 reciprocated by a lever 53 pivoted at 64, for causing said cylinder 50 to be intermittently rotated about its shaft 64. At any cycle of operation, the said cylinder 50 is alternately kept at a standstill and rotated (through 60°, in the embodiment shown) in such manner as to move one row of recesses 56 to the position just occupied by an adjacent row of recesses. The said reciprocating means may be actuated in any known manner and any conventional mechanism may be applied for operating same. According to Fig. 8, said lever 53 is reciprocated by connecting rod 54 pivotally connected at its ends to the free end of said lever 53 and to a crank 55, respectively, the said crank 55 being rotated by any suitable motor (not shown).

Right above said cylinder 50 a hopper 57 is firmly supported by said frame structure 83 of the apparatus, into which hopper a charge of natural fruits may be introduced, the said hopper 57 being positioned parallel to the axis of cylinder 50 and extended at least to cover the extension of said rows of recesses 56. The bottom of said hopper 57 is provided with channel-shaped passageways 58 of such number, spacing and arrangement that any one of said passageways 58 is positioned right above one of the recesses 56 that is included in the row of recesses facing upwardly as said cylinder is at a standstill. Said passageways 58 are further dimensioned to allow passage of one single fruit 20 so that as a fruit of the type described drops down one of said passageways the stem of said fruit is compelled to turn substantially upright. According to the above, as a fruit 20 drops through said passageway into the recess 56 positioned below, fruit 20 will be received into said recess but stem 23 thereof will extend substantially radially out from the surface of cylinder 50, as shown diagrammatically in Fig. 8.

The lower openings of said passageways 58 are substantially spaced above the surface of cylinder 50 and in these spaces are arranged in superimposed position a plate member 59 and a mechanically operated pincer 61, immediately below each passageway 58, both said plate member and said pincer being movable horizontally for having the fore portions thereof moved above and away from the recess 56, as shown in Figs. 9 and 8, respectively, the said plate member being provided in the front thereof with an open slot 60 (see Fig. 11, section "b") wide enough to freely surround the stem 23 of a fruit 20 contained in the recess 56 below but not wide enough to allow passage of the fruit, means being provided for reciprocating said member and pincer corresponding to the cycle of operation of the apparatus, such as it will be hereinafter described. In the embodiment shown, said pincers 61 are supported by arms 77 which are connected to one another by a cross-rod 78 supported by arm levers 75 positioned at the sides of cylinder 50. Further, said arms 77 pass through openings 79 provided in the rear portions of said plate members 59 (Fig. 10), the said openings 79 being noticeably longer than the cross-section of said arms 77, so that said arms 77 may perform a certain horizontal movement before said plate members respectively co-operating therewith start to move.

In the embodiment shown, the movable assembly comprising said pincers 61 and said plate members 59, is reciprocated according to the cycle of operation by the action of a cam means 76, which is integral with said crank 55, so that the motion of said pincers and plate members synchronizes with the intermittent rotation of said cylinder 50. The said pincers 61 are caused to close about said stems 23 in moving towards their advanced position by pairs of cam-shaped stop members 80 (see Fig. 11, section "a") firmly supported by frame structure of the apparatus.

Inside said cylinder 50 means are provided for having the fruits 20 ejected from said recesses 56 upon execution of the stone drawing out step. According to Fig. 8, said ejecting means comprises a plurality of radial ejecting rods 62, co-axial with recesses 56 and penetrating through the bottoms thereof, the inner ends of said radial ejecting rods 62 abutting on and co-operating with a cam member 63 (a single cam member 63 being provided for each ring of recesses 56) made integral with said cylinder supporting shaft 64 which is fixedly connected to the frame structure 83 of the apparatus, as above stated, the said cam member 63 being so arranged that said ejecting rods 62 penetrate respective recesses 56 when they reach a downwardly facing position, owing to the intermittent rotation of said cylinder 50, suitable spring means, coil spring 65 disposed about an ejecting rod 62 for example, being provided for having said rods withdraw from said recesses 56 but only when said cam member 63 co-operates therewith.

Further, the apparatus comprises means for keeping the fruits 20 in said recesses 56 at their correct position until the stone drawing out step has been executed, for ensuring the correct introduction of the operative parts of the stone seizing and drawing out device through the tears 22 made in the surface of fruits 20 by prior tearing off of respective stems 23. In the embodiment shown in Figs. 11 and 12, said holding means comprise, for any recess 56, a pair of counter-facing movable jaws 70, forming the side walls of the respective recesses 56, and preferably set in some soft or resilient material, as sponge-rubber or foam-rubber for example. Said jaws 70 are supported by two-armed levers 71 cyclically operated by axial cams 72 made integral with said shaft 64 fixedly connected to the apparatus frame structure, the said axial cams 72 being so arranged that during intermittent rotation of cylinder 50 about shaft 64 said jaws 70 close about the fruit received in the relative recess 56 as said recess leaves its receiving position under the respective passageway 58, and that said jaws 70 are kept in closed relationship until the respective recess reaches the downwardly facing position at which the above described ejecting means operate.

The apparatus comprises a plurality of pit or stone seizing and drawing out devices of the type shown in Figs. 1 to 4 inclusive and above described with reference both to their construction and operation. Said devices, indicated by reference numeral 33 in Figs. 8 to 11 inclusive, are the same in number as the number of recesses 56 in each row and are arranged in a row adjacent cylinder 50. Said devices 33 are pivotally supported in by swing arm members 73 fixedly connected to and pivoted to shaft 84 in turn pivotally supported by the apparatus structure frame and arranged parallel to the cylinder axis. Said assembly comprises a plurality of arm members 73 and the devices 33 respectively supported thereby is swung back and forth according to the cycle of operation of the apparatus by same above described reciprocating mechanism driving pincers 61 and plate members 59, by means of a connecting rod 74 pivotally connected at its ends to the lower end of lever 75 included in said mechanism and to a suitable arm (not shown) made integral with shaft 84.

The devices 33 are supported by said arm members 73 in such a position that as said devices are swung towards said cylinder 50 the operative parts of the devices are introduced into the fruit 20 contained in recesses 56 corresponding to the row adjacent to the row which is positioned below hopper 57 and which precedes said latter row according to the direction of rotation of cylinder 50. For having the movable members 31 and 32 of said operative parts of the several devices operated according to the steps of the method described with reference to Figs. 1 to 4 inclusive, the apparatus shown in Figs. 8 to 11 inclusive is provided with rods 81 and 82 parallel to the axis of cylinder 50, fixedly supported by the apparatus frame structure and positioned with respect to said swinging devices 33 to act as stop members co-operating with the rear crank portions 36 and 37 (see Figs. 1 to 4) for having the movements inherent to said steps performed.

Further, in consideration of the fact that it is not desirable that the fruit 20 be too tightly clasped between jaws 70, for the sake of the fruit, due to the fact that during the drawing out of the fruit stones a considerable pulling may be applied, the described apparatus is preferably also provided with auxiliary means for preventing extraction of the whole fruit from the respective recess 56 while the stone thereof is being extracted. Said auxiliary means comprises a cross-plate member 85 supported by and fixedly connected to frame 83 of the apparatus, and positioned in facing relationship with the row of recesses 56 in which the fruit are subjected to the stone extraction by said devices 33. Said cross-plate member 85 is provided with a plurality of openings 86 positioned so as to allow free passage of the operative parts of said devices 33 but being of smaller size than the whole fruit so that even though said fruit is torn from said jaws it is prevented from being fully extracted from recesses 56, owing to the stop action exerted by said cross-plate member 85.

The apparatus above described and shown in Figures 8 to 12 inclusive operates as follows:

When the cylinder 50 is at the beginning of the standstill phase of its intermittent rotational motion, a row of recesses 56 is immediately below passageways 58 and the recesses 56 corresponding to preceding adjacent row are facing the openings 86 of the cross-plate member 85. As said standstill phase begins, said cam means 76 causes pincers 61 and plate members 59 to temporarily withdraw to the position shown in Fig. 8, thus allowing a single fruit 20 to drop into the corresponding recess 56 beneath corresponding passageway 58. In said Fig. 8 a fruit 20 is shown as being in the recess 56 positioned under passageway 58 and the stem 23 thereof is shown as directed upwardly above the surface of said cylinder 50. While said cylinder 50 is kept at standstill, cam means 76 moves plate member 59 and pincers 61 under passageway 58 and about said stem 23 of the fruit, the said stem penetrating into said slot 60 of plate member 59 it being clasped by pincers 61, automatically closed by the action of co-operating cam members 80, as shown in Fig. 9.

Then, during the standstill of cylinder 50 said cam means 76 moves said pincers 61 back towards its withdrawn position and by the effect of said withdrawing movement, the stem 23 is torn off the respective fruit 20, as shown in Fig. 10 while said plate members 59 covering said fruit 20 contained inside the recesses 56 below prevent said fruits being extracted by the stem tearing off action. At this point it will be readily understood that, as said cycle of operations has been completed, in any recess 56 belonging to an upwardly facing row, a fruit 20 is made stemless and has its tear 22 (see back Figs. 1 and 4) turned outwardly in substantially radial direction with respect to cylinder 50.

Further, while at any standstill phase of the cycle of intermittent rotation of cylinder 50 the above described cycle of operation proceeds with respect to the fruit dropped and contained in said row of upwardly facing recesses 56, the stone seizing and drawing out devices 33 perform their own previously described cycle of operations in the fruit 20 contained into recesses 56 in the adjacent row and which have been subject to the above described first cycle of operation during the previous standstill phase of intermittent rotation of cylinder 50, the operation of said devices 33 being synchronized with the movements of pincers 61 and with plate-members 59 due to the common reciprocating action of lever 75 on both said assemblies of devices and means. The swinging action of said arm levers 73 pushes the operative parts of devices 33 through openings 86 into the fruits 20, the action of stop member 81 on rear crank portions of movable members of devices 33, as the latter have their operative parts inside the fruit, causing said members to rotate in direction A (see back Figs. 2 and 3) and the action of stop member 82 on the rear crank portions causing the movable members of devices 33 to rotate back in the direction B (see back Fig. 4) for freeing the extracted stone 21 as said devices are fully swung back in the position shown in Fig. 10.

Further, while the set of fruit 20 are subject to said first introducing and stem removing cycle of operation in a row of upwardly facing recesses 56 and another set of now stemless fruit are subject to the stone extraction, a third set of fruit 20 made stoneless are delivered from the recesses 56 while in downwardly facing position by simple dropping thereof and, in the case of adherence of fruit to recesses 56, by the action of the described ejecting rods 62.

Between any subsequent standstill phases, during which all said operations are synchronously performed, as above described, the said mechanism comprising push-arm 52 and lever 53, operated synchronously with the other described devices, moves the said cylinder 50 for carrying the various rows of recesses 56 successively under the action of said devices. The rotative motion of said cylinder 50 with respect to cam members 63 and 72 causes the said ejecting rods 62 to operate synchronously according to the above described cycle of operations and respectively causes the said jaws 70 to close about the fruit made stemless and properly set in said correct position in respective recesses 56 for having the operative parts of devices 33 penetrate into the fruit 20 substantially through the tears 22, the said jaws 70 being successively open as said recesses reach their downwardly facing position and before the action of said ejecting rods 62.

It is apparent, therefore, that I have provided a novel apparatus for having fruit of the character described delivered in large amounts in stoneless form and in the most commercially appreciated shape, and particularly without apparent substantial damage to the appearance, pulp and juice thereof, the said apparatus being fully automatic and operating on the fruit in a neat and faultless way. The said apparatus, however, may be constructed by applying current knowledge in a form other than the one described, as it will be apparent to those skilled in the art. For example, while in the apparatus described all operative parts, members and devices are operated by mechanical means, any other suitable means, hydraulic means for example, may be provided for causing said operative parts to be driven as described. Further, the above described apparatus or an equivalent thereof may be advantageously combined with other apparatus, a screening device, for example, for having fruit of nearly uniform size fed into the apparatus or delivered therefrom, and/or a washing apparatus for having the fruit properly cleaned, and so on.

It is to be therefore understood that my invention is not limited to the specific embodiments shown or apparatus described and that various deviations may be made therefrom without departing from the spirit and scope of the appended claims.

What I claim as new and desire to have protected by Letters Patent in the United States of America is:

A pit removing device comprising, in combination, an elongated hollow shaft; a first elongated, substantially pointed, spoon-shaped member fixed to and extending from one end of said shaft and having a sharp peripheral edge; a pair of additional spoon-shaped members substantially identical with said first spoon-shaped member and nesting in each other and said first spoon-shaped member in one position of the device, all of said spoon-shaped members being completely separated from each other; a pair of rods respectively fixed at one end to said pair of spoon-shaped members and extending through said hollow shaft so as to be turnable therein; and a pair of cranks respectively fixed to said rods at the ends thereof opposite from said pair of spoon-shaped members and located beyond the end of said shaft opposite from said first spoon-shaped member, so that said pair of spoon-shaped members may be simultaneously turned, upon actuation of said cranks, in opposite directions, respectively, away from and back to said one position, said first spoon-shaped member being located in its entirely on one side of the axis of said hollow shaft and having its pointed end spaced from said axis, and said pair of additional spoon-shaped members respectively being located in their entirety on one side of the axes of the rods to which they are respectively fixed with their pointed ends respectively spaced from said axes, so that all of said spoon-shaped members may be turned with respect to each other to a position where they are all spaced from each other and distributed about a common axis with the pointed ends of said spoon-shaped members all spaced from said common axis.

References Cited in the file of this patent

UNITED STATES PATENTS

| | | |
|---|---|---|
| 1,071,333 | Pease | Aug. 26, 1913 |
| 1,698,476 | Frova | Jan. 8, 1929 |
| 1,785,002 | Duncan | Dec. 16, 1930 |
| 1,876,492 | Frova | Sept. 6, 1932 |
| 1,930,937 | Kent | Oct. 17, 1933 |
| 1,994,366 | Mellor | Mar. 12, 1935 |
| 2,500,648 | Sunseri | Mar. 14, 1950 |
| 2,506,889 | Pinard | May 9, 1950 |
| 2,633,814 | Chester | Apr. 7, 1953 |
| 2,660,208 | Williams | Nov. 24, 1953 |

FOREIGN PATENTS

| | | |
|---|---|---|
| 625,009 | France | Apr. 16, 1927 |
| 20,362/29 | Australia | May 29, 1930 |